Oct. 6, 1925.

T. B. CONRADT 1,555,833

SIMPLEX TRACTOR PLOW

Filed Oct. 14, 1920

INVENTOR
T. B. Conradt
BY
Adam E. Fisher
ATTORNEY

Patented Oct. 6, 1925.

1,555,833

UNITED STATES PATENT OFFICE.

THOMAS B. CONRADT, OF LOMETA, TEXAS.

SIMPLEX TRACTOR PLOW.

Application filed October 14, 1920. Serial No. 416,794.

*To all whom it may concern:*

Be it known that I, THOMAS B. CONRADT, a citizen of the United States, residing in the city of Lometa, county of Lampasas, and State of Texas, have invented new and useful Improvements in Simplex Tractor Plows, of which the following is a specification, reference being had to the accompanying drawings.

This invention pertains to tractor plows.

The object is to provide a plow of this kind in a very simple, compact and efficient form of construction.

In the drawings

Figure 1:
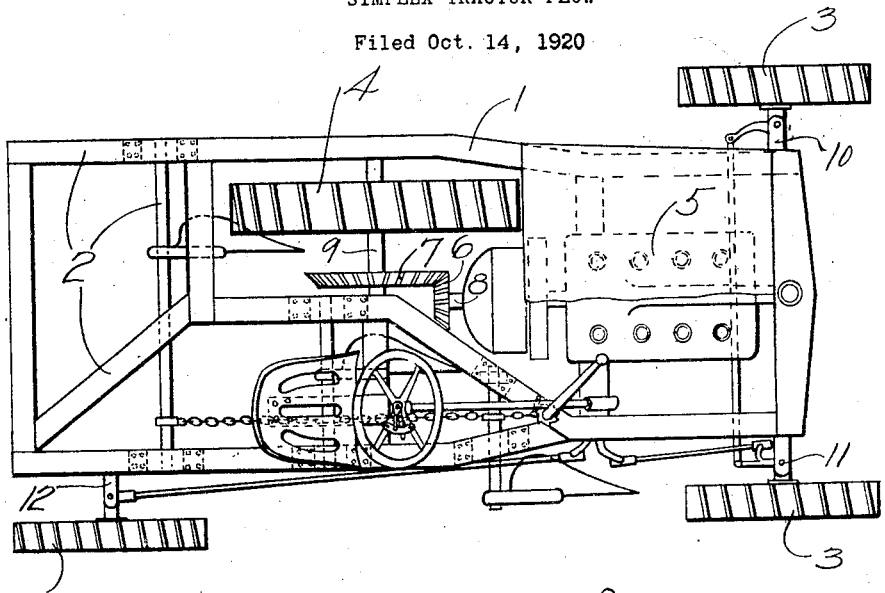
Fig. 1 is a plan view.
Figure 2:
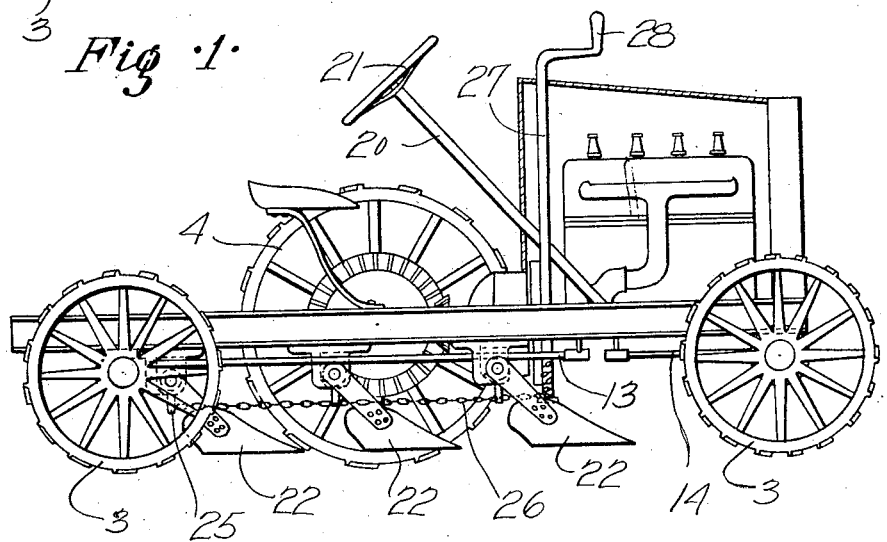
Fig. 2 is a side elevation.
Figure 3:
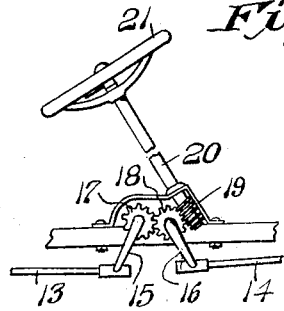
Figure 3 is a detail of the double acting steering mechanism.

The invention consists of a simple, rectangular chassis 1, including the frame 2, carrying wheels 3, drive wheel 4 and engine 5. The engine is connected with the drive wheel by means of the intermeshing bevel gears 6 and 7 mounted respectively upon the crank shaft 8 and the drive shaft 9. The crank shaft 8 extends longitudinally backward, while the drive shaft 9 is journaled transversely in the frame 2. The drive wheel 4 is rigidly mounted on the drive shaft 9.

The two frontal carrying wheels are pivoted to the axle 10 by the bolts 11 in ordinary form, and the rear carrying wheel is in the same way connected to the stub shaft 12.

A double acting steering gear is provided, consisting of the two rods 13 and 14, having connection in usual form with the knuckles of the front and rear wheels, and at their adjacent ends connected to cranks 15 and 16 extended radially from the intermeshing gears 17 and 18. The gear 18 engages the worm 19 of the steering post 20. A turn upon the steering wheel 21 thus results in including the two front wheels in one direction and at the same time the rear wheel in the opposite direction, and so greatly accelerating the turning of the entire tractor. This feature is of great benefit in the field.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

In a tractor steering mechanism the combination with front and rear pivoted knuckles of a steering post having a worm, front and rear intermeshing gears, one of the gears also meshing with the worm of the steering post, crank elements carried by the gears and simultaneously movable in opposite directions when the gears are rotated by the worm and front and rear rods connecting the crank elements with the front and rear steering knuckles.

THOMAS B. CONRADT.